United States Patent [19]

Narita

[11] 4,220,681
[45] Sep. 2, 1980

[54] TRIM FOR AUTOMOBILES

[75] Inventor: Kozi Narita, Nagoya, Japan

[73] Assignee: Inoue Gomu Kogyo Kabushiki Kaisha, Aichi, Japan

[21] Appl. No.: 967,631

[22] Filed: Dec. 8, 1978

[30] Foreign Application Priority Data

Nov. 28, 1978 [JP] Japan .................. 53-147636

[51] Int. Cl.² .................. B60R 13/02; B60R 13/04
[52] U.S. Cl. .................. 428/31; 52/716; 49/490; 293/126; 293/128; 428/332; 428/463
[58] Field of Search .................. 293/121, 126, 128, 144; 52/716; 428/31, 463; 49/490, 491, 492, 495, 496, 497

[56] References Cited

U.S. PATENT DOCUMENTS

| 3,013,919 | 12/1961 | Bialy | 293/121 X |
| 3,681,180 | 7/1969 | Kent | 293/128 X |
| 3,687,792 | 8/1972 | Ruff | 293/128 X |
| 3,770,545 | 11/1973 | Jackson | 293/128 X |
| 4,010,297 | 3/1977 | Wenrick | 293/128 X |

FOREIGN PATENT DOCUMENTS 732759  6/1955  United Kingdom .................. 293/126

Primary Examiner—George F. Lesmes
Assistant Examiner—Alexander S. Thomas
Attorney, Agent, or Firm—Armstrong, Nikaido, Marmelstein & Kubovcik

[57] ABSTRACT

Trim for an automobile characterized in that a thin metal layer is integrally laminated on the surface of a substrate consisting of plastic, and said metal layer is partially or wholly coated with a soft PVC resin composition and thus a trim for an automobile with a matt surface is obtained by setting a specific value of viscometric degree of polymerization in said PVC resin composition.

3 Claims, 28 Drawing Figures

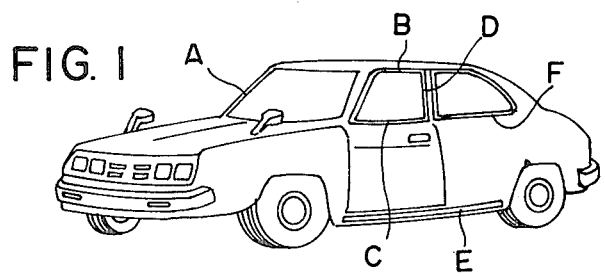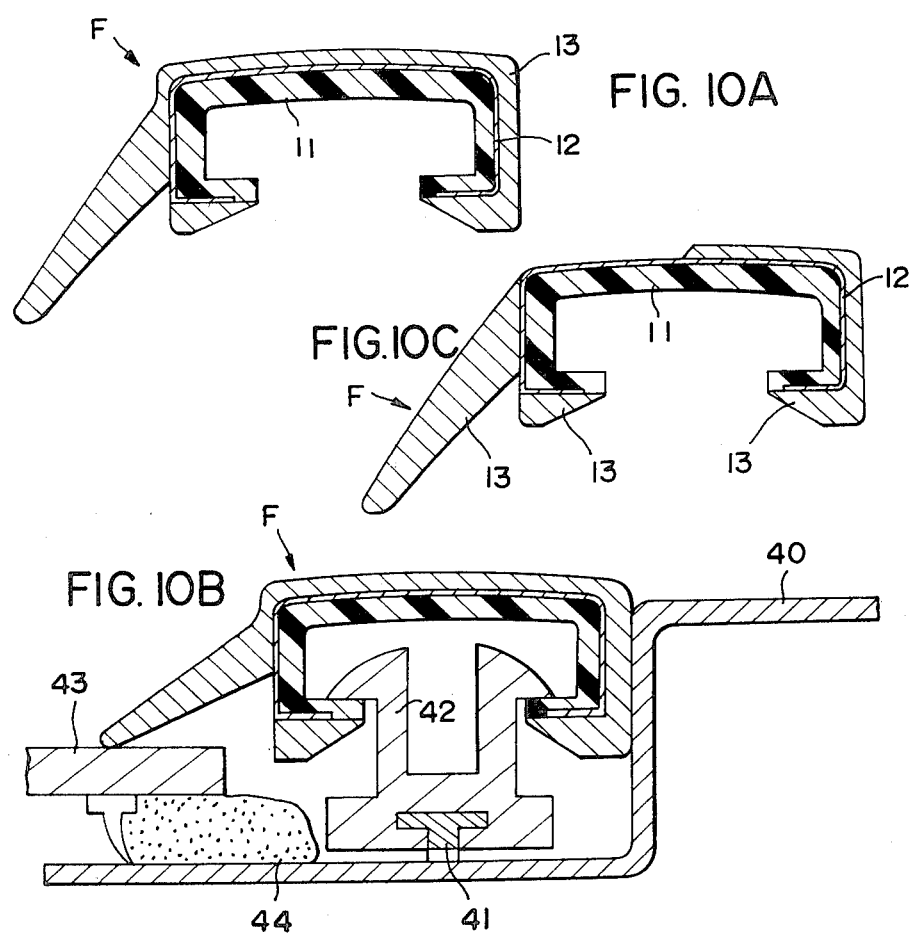

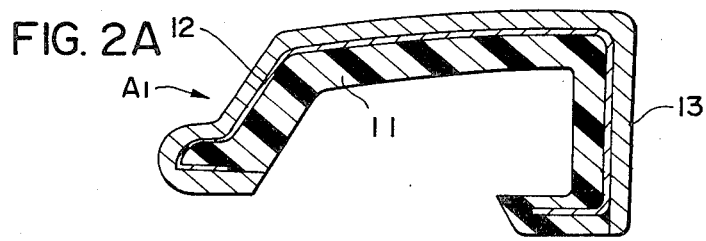
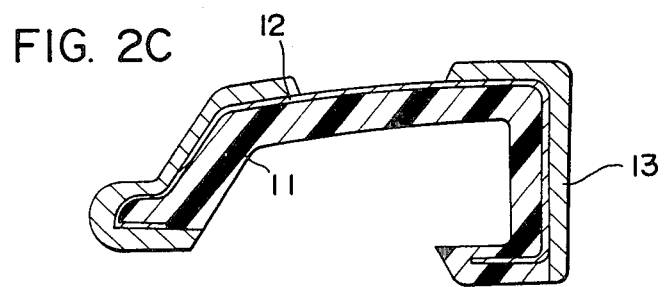
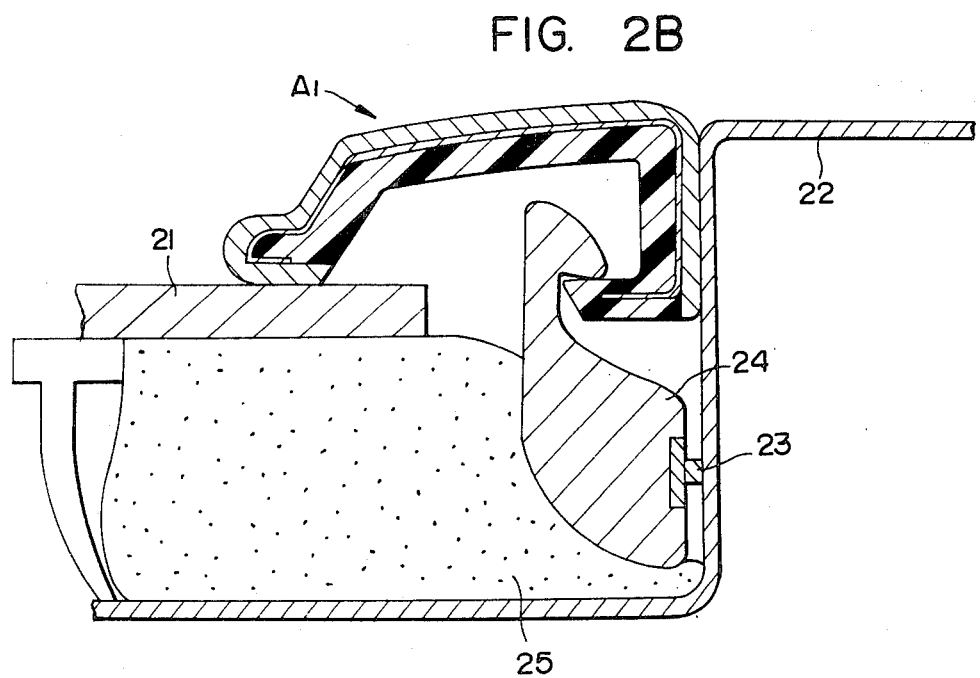

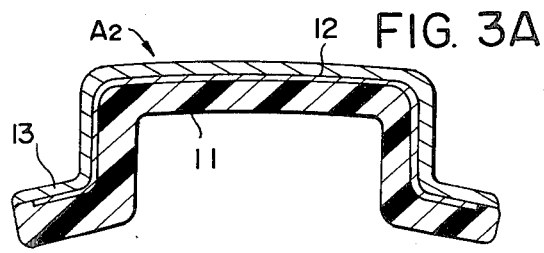
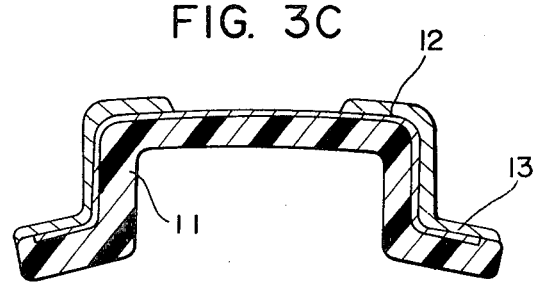
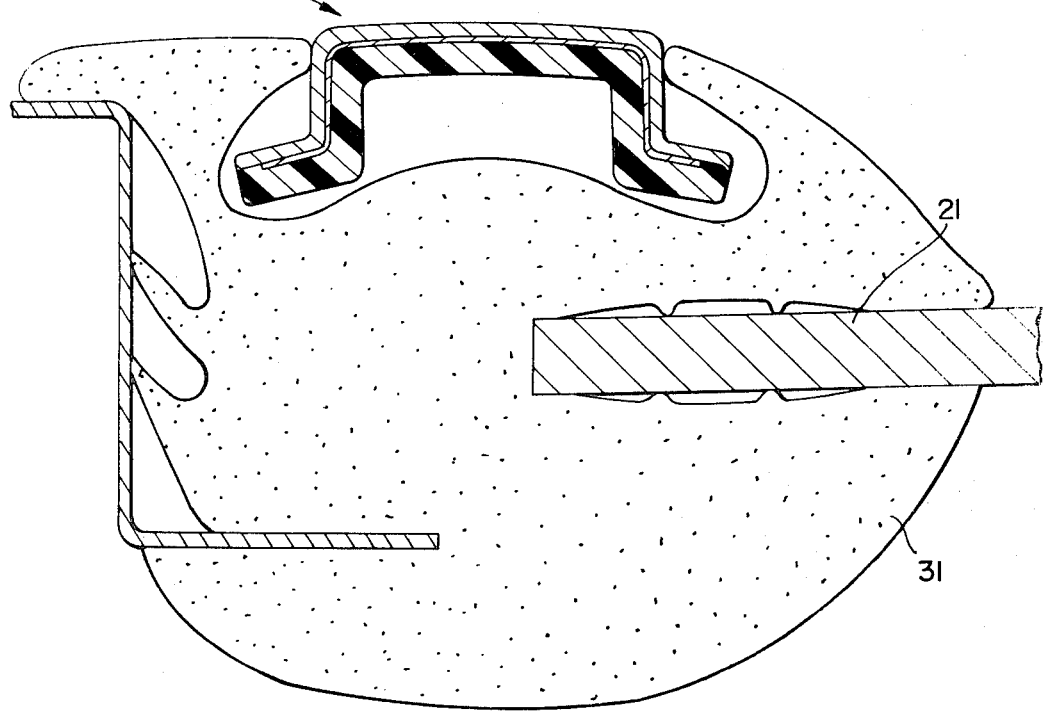

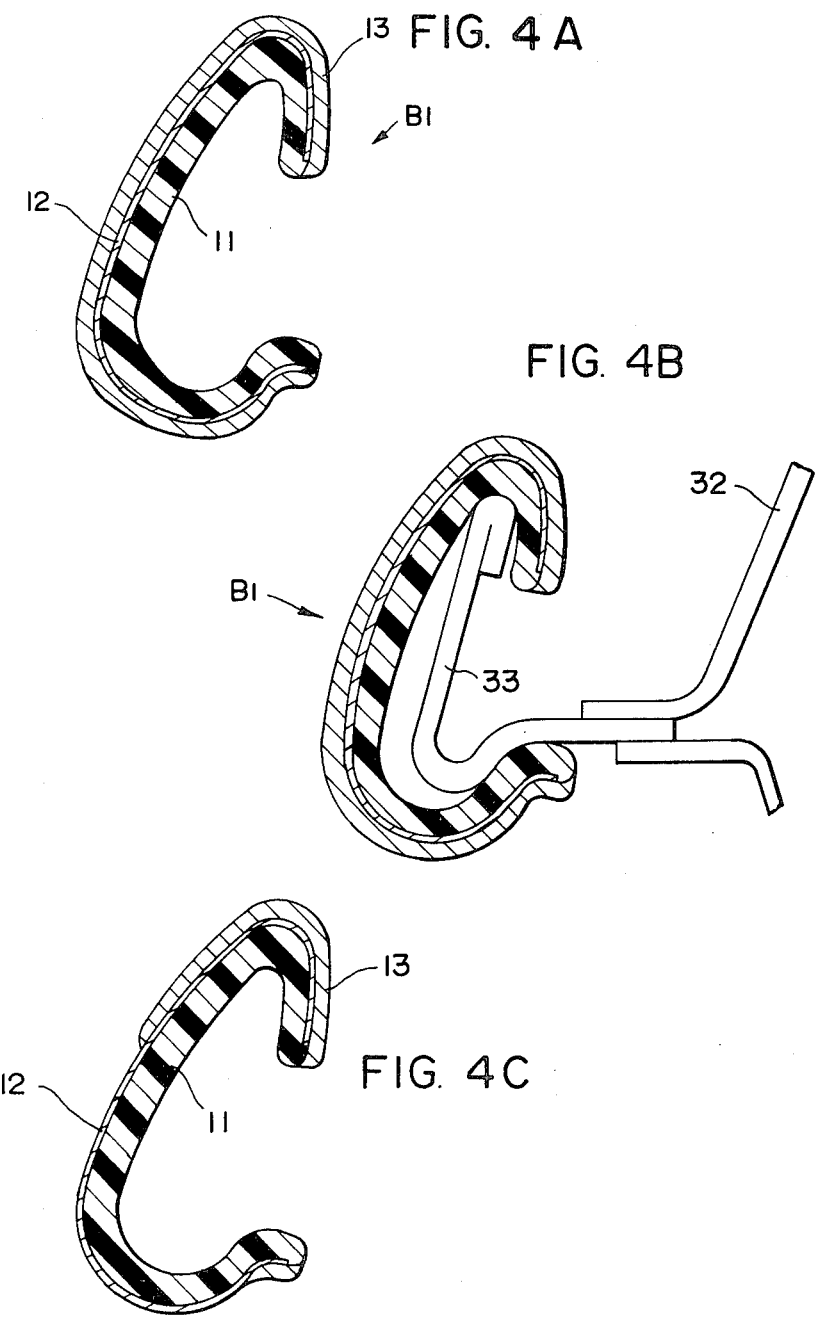

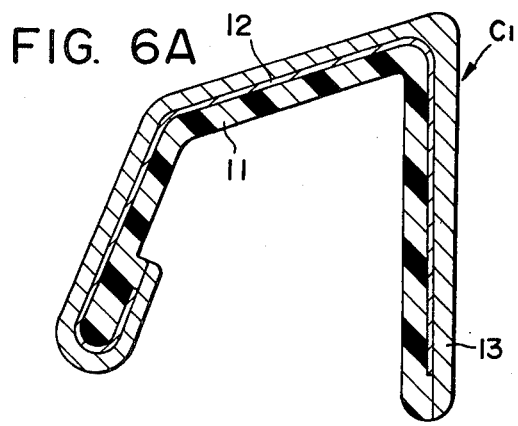
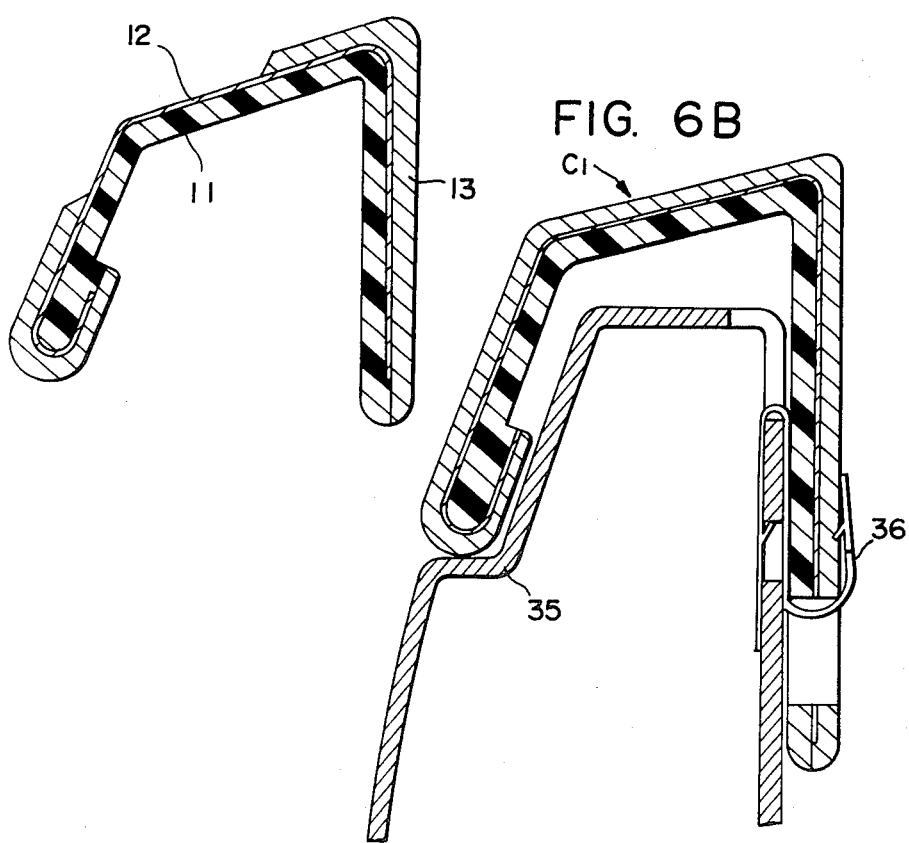

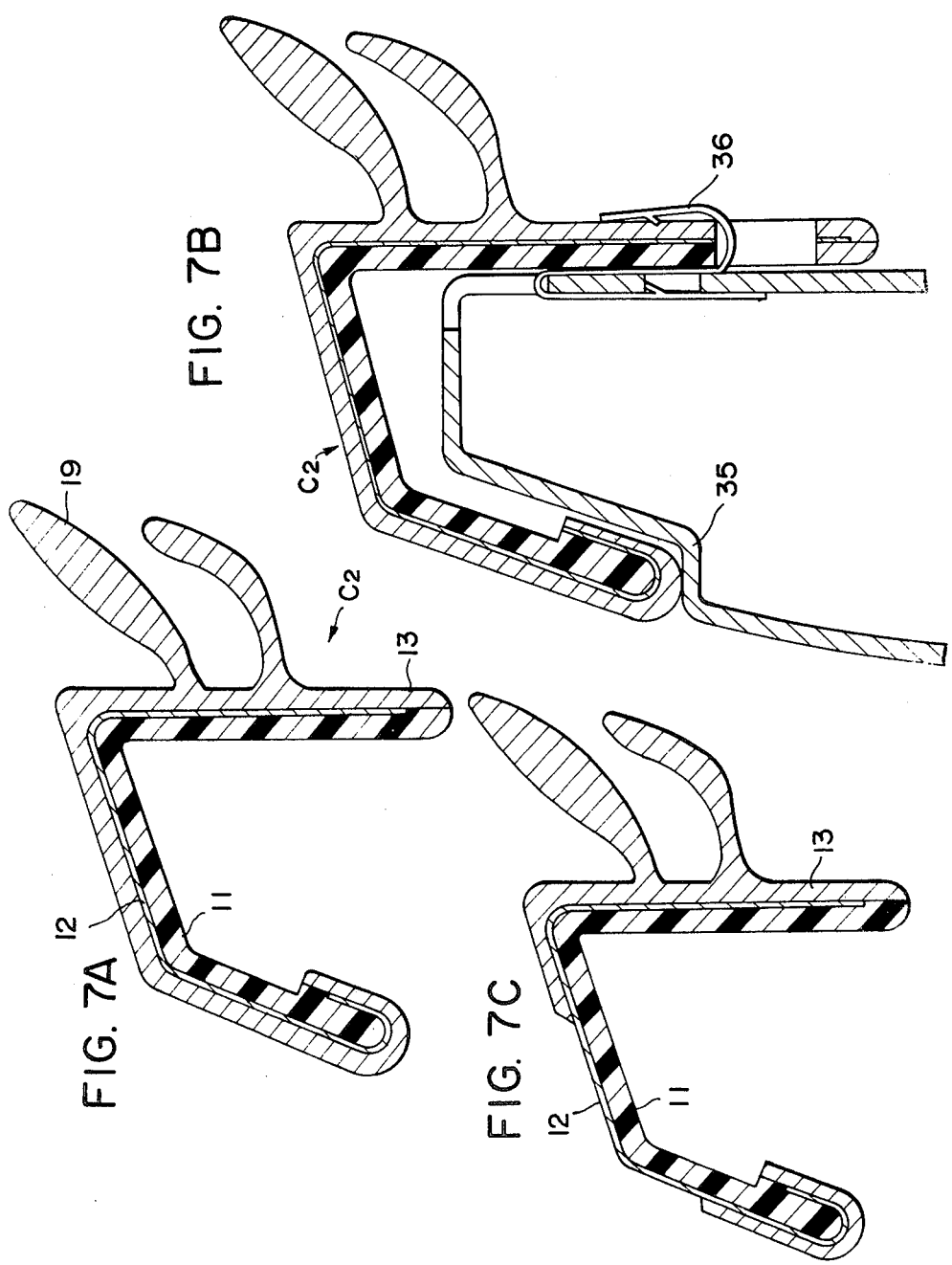

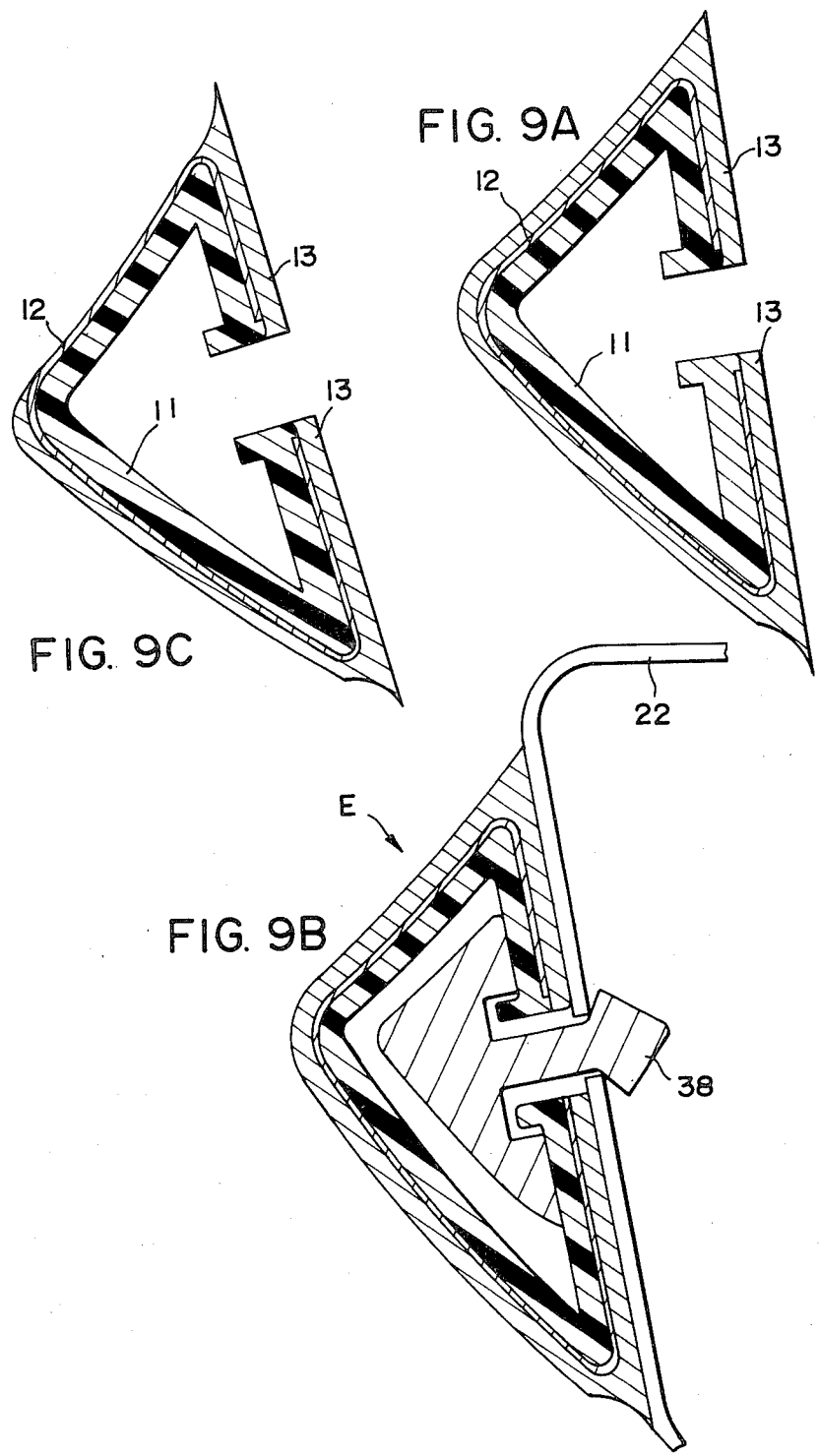

TRIM FOR AUTOMOBILES

BACKGROUND OF THE INVENTION

Conventionally auto body side, door, window, roof, etc. are attached with a metallic or plastic trim (or trim strip) for the purpose of protection, guide or decoration.

Among others, such trims that on the surface of substrate comprising heat resistant plastics such as ABS resin, polyamide resin or PVC resin is integrally laminated with an aluminum or stainless foil or with a plastic film vapor-deposited with aluminum or the like, have come to be popularly used from recent requirement of lightening the weight of automobiles and standpoints of reducing manufacturing cost thereof and the like.

Such plastic trims have a metallic luster on the surface, but they are monotonous and dull in color; when attached to the auto front or rear, they reflect the light and dazzle not only the driver driving such a car, but also a driver of a car on an opposite lane or of a trailing one; moreover, when applied to various auto parts, a substrate consisting of hard resin or a thin metal layer is liable to injure the surface of vehicle body; and after applied to the body, they are liable to issue noise with vibration of the body or injure the surface, resulting in corrosion of the body.

Particularly in the case of a trim having its surface coated with a metal foil, a difference in the potential develops through contact of dissimilar metals at the interface between metal foil and body plate and a current generated by this potential difference precipitates corrosion of the body surface, which is a so-called electrolytic corrosion.

In an effort to eliminate such drawbacks of the conventional trim,, the inventor made an attempt at producing a trim with matt surface by integrally coating the surface of a plastic trim with an elastomer, particularly a soft PVC resin.

For this purpose the ABS resin or polyamide resin to constitute the substrate had to be molded together with said soft PVC resin in the same die, but they required different molding temperatures (about 220°–230° C. for ABS and polyamide resins; and about 150°–160° C. for PVC resin). Meanwhile, the thin metal foil to be laminated had to be preheated to a melting temperature of plastics (in this case, temperature close to the melting point of ABS or polyamide resin) to assure good adhesion to these plastics. Thus the die had to be held at over 200° C. at least to obtain the molded product. When the ordinary PVC was molded at such a high temperature, the molten surface of the product inevitably became glossy and the matt surface desired could not be yielded.

SUMMARY OF THE INVENTION

The present invention relates to a synthetic resin trim or trim strip for automobiles.

The first object of the present invention is to provide a trim with unique appearance, which comes from a fanciful matt coat given to the surface, a multi-colored effect created by addition of pigment and a partially exposed thin metal layer which is a visible part.

The second object of the present invention is to provide a glare-free trim wholly or partially coated with a matt film which prevents reflection.

The third object of the present invention is to provide a trim which, when applied and after applied, does not scratch the painted surface of the auto body and thereby prevents an electrolytic corrosion or rusting of the auto body.

BRIEF DESCRIPTION OF THE DRAWINGS

FIG. 1 is an oblique view of an automobile indicating the positions where trims according to the present invention are attached.

FIGS. 2a, 2c, 3a and 3c are sectional views showing window trims according to the present invention.

FIGS. 2b and 3b are sectional views illustrating applications of said window trims.

FIGS. 4a, 4c, 5a and 5c are sectional views showing roof drip trims according to the present invention.

FIGS. 4b and 5b are sectional views illustrating applications of said roof drip trims.

FIGS. 6a, 6c, 7a and 7c are sectional views of door belt trims according to the present invention.

FIGS. 6b and 7b are sectional views illustrating applications of said door belt trims.

FIGS. 9a and 9c are sectional views showing step trims according to the present invention.

FIG. 9b is a sectional view illustrating an application of said step trim.

FIGS. 10a and 10c are sectional views of quarter window trims according to the present invention.

FIG. 10b is a sectional view illustrating an application of said quarter window trim.

DETAILED DESCRIPTION OF THE INVENTION

Figure 5A:
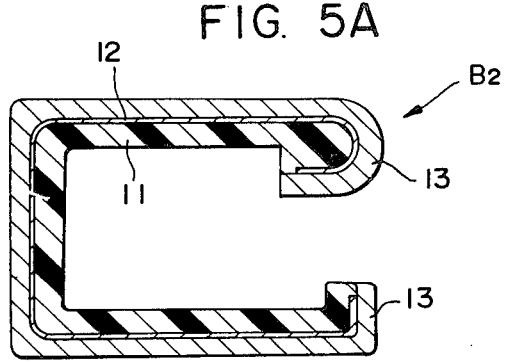
Figure 5B:
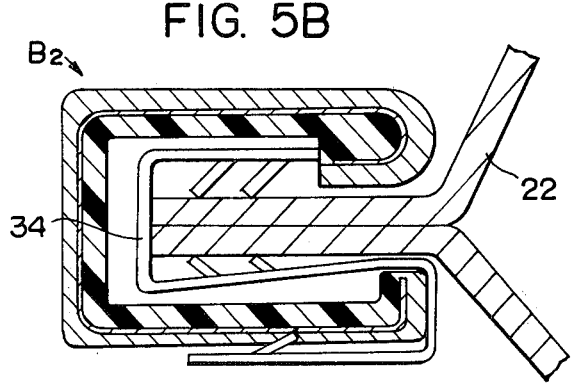
Figure 5C:
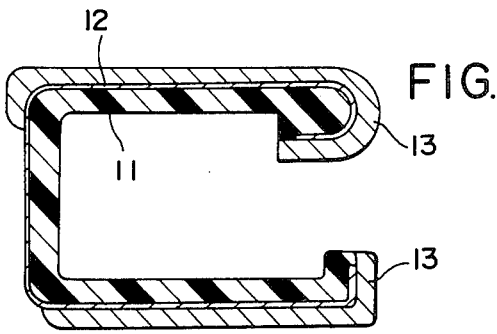

In FIG. 1 which is an oblique view indicating the positions in an automobile where the trims according to the present invention are attached, A is the window trim, B the roof drip trim, C the door belt trim, D the door frame trim, E the step trim and F the quarter window trim. FIG. 2a and succeeding ones illustrate embodiments of respective trims. The figures affixed with a are sectional views of embodiments in which a film of PVC resin composition is applied over the entire surface of the trim which part is exposed to view after attached. The figures affixed with b are sectional views showing the state of the trim as attached to the auto body. The figures affixed with c are sectional views of embodiments in which the trim surface is coated with PVC resin composition and has a partially exposed thin metal layer.

Now the constitution of the present invention is described with reference to FIG. 2a. FIG. 2a refers to the window trim A1 of a direct-glazing type. The trim A1 has a thin metal layer 12 integrally laminated on the surface (which is exposed to view after the trim is attached) of the substrate 11, which defines the configuration of the trim and said thin metal layer 12 has a film 13 of soft PVC resin composition integrally laminated on its surface.

The substrate 11 is composed of a relatively heat-resistant plastic, for instance, ABS resin, polyamide resin, polycarbonate, PVC, polyphenylene oxide, acrylonitril-styrene, polypropylene; or such plastics as reinforced with glass fibers; or their foamed products.

The thin metal layer 12 is a foil or sheet about 0.03–0.2 mm thick of stainless steel, aluminum or steel, which strengthens the trim or decorates at least one side of it.

When an aluminum foil is employed, it is desirably submitted to anodic treatment to form an oxide film thereon.

Said metal layer 12 may be a synthetic resin film of polyester or vinyl fluoride with vapor-deposition of such metals as aluminum, stainless steel, chrome, nickel, etc.

The soft PVC resin composition 13 to be applied on the surface of the metal layer 12 is composed of a PVC resin polymerized to a high degree, a filler mainly consisting of calcium carbonate, a plasticizer of trimellitate, a high molecular plasticizer of epoxy or polyester system, an adequate quantity of stabilizer and a desired pigment. The high-polymerized PVC resin has desirably a value of $\overline{P}$, i.e., the viscometric degree of polymerization in the range of 2000–5000, preferably 3000–4000. Resin with a high value of P is effective for yielding a product with matt surface, but too high a value of $\overline{P}$ is not desirable, because it increases the viscosity of a molten resin and accordingly decreases the moldability of the resin. On the contrary, a low-polymerized PVC resin makes the surface of the high-temperature molded product glossy instead of matt, which is desirable.

Calcium carbonate as the filler promotes the matting of PVC resin, usually 20–50 weight parts, preferably 30–50 weight parts of it being appropriate for the purpose. Too little of it fails to promote the matting, whereas too much of it deceases the moldability of resin and deteriorates the function of the trim by decreasing the properties of the trim, such as low-temperature impact strength.

As the plasticizer, an ordinary one may be employed, but its migration is likely to cause a fading of the body paint color, deterioration of physical properties in the soft PVC resin layer or to give an adverse effect on the resin constituting the substrate. To prevent these effects as far as possible, it is desirable to use non-migrating plasticizer which is heat resistant such as trimellitate; for example, tri-2-ethylhexyl trimellitate, triisodecyl trimellitate or tri-normaloctyl trimellitate; a polyester plasticizer having 1000–7000 of number-average molecular weight; an epoxy plasticizer; or a high-molecular plasticizer as their combination. As the polyester plasticizer the following are available; polypropylene adipate, polyethylene adipate, polybutyrene adipate, polypropylene cebacate, polyethylene cebacate. As the epoxy plasticizer the following are available; epoxized soybean oil, epoxized linseed oil, epoxized glyceride; and in some cases, liquid nitril rubber. Ordinarily 40–100 weight parts of this plasticizer are blended, but the quantity can be changed to suit the requirement of flexibility of the trim.

The stabilizers available include; stabilizer of barium-zinc system, i.e., complex of higher fatty acid salts such as stearate or oleate; for instance, barium stearate, zinc stearate, barium laurate, zinc laurate, barium naphthenate, zinc naphthenate; and lead system stabilizer such as tribasic lead sulphate or lead stearate, which is heat resistant.

The pigment can be arbitrarily selected to develop a desired hue; depending on the requirement, the following pigments are available; inorganic ones such as carbon black (black), rouge (red), cadmium red (red), titanium oxide (white), zinc flower (white), lead carbonate (white); and organic ones such as Hansa Yellow (yellow), Benzidine Yellow (yellow).

The above description applies also to the constitution of the trims illustrated in FIG. 3a and thereafter.

Next, description is made of a trim illustrated in FIG. 2c which has its thin metal layer partially exposed.

This trim is obtained by extrusion-coating of soft PVC resin in such manner that the thin metal layer can be partially exposed or by coating the entire surface of the thin metal layer with soft PVC resin, followed by peeling off the resin from a specified area of the surface. As seen from the drawing, a partial exposure of the metal layer 12 on the visible part of the trim creates a strong contrast of a metallic luster against the matt ground of PVC resin film.

If a pigment is added to PVC resin composition, a trim with colorful matt surface will be obtained depending on absence or presence of a variety of pigments.

Next, some additional explanations are made about each of the attached drawings.

FIG. 2a, as described above, shows an embodiment of a trim A1 for the direct-glazed window. As seen from FIG. 2b, this window trim is attached to the clip 24 fitted to the T-stud 23 fastened to the body surface 22, and thereby it serves to hide the fixture of the window glass 21; in the figure, 25 denotes the bonding agent.

FIG. 3a shows a trim A2 for weather strip type window. In this case both the window glass 21 and the window trim A2 are fitted to the weather strip 31.

FIG. 4a shows a roof drip trim B. The type B1 with an approximate configuration of C has its opening engaged in the rain gutter 33 provided in the roof panel 32 of the body.

FIG. 5a shows another embodiment of the roof drip trim B, i.e., the type B2, which is attached to the body surface 22 indirectly through the clip 34.

FIG. 6a relates to a door belt trim C, which is attached to the stepped part 35 of the door metal through the clip 36.

FIG. 7a illustrates a door belt trim C2 with a lip 19, which is also attached to the stepped part 35 of the door metal through the clip 36. In this embodiment the lip 19 is an integral part of the PVC resin composition 13 on the trim surface.

Figure 8A:
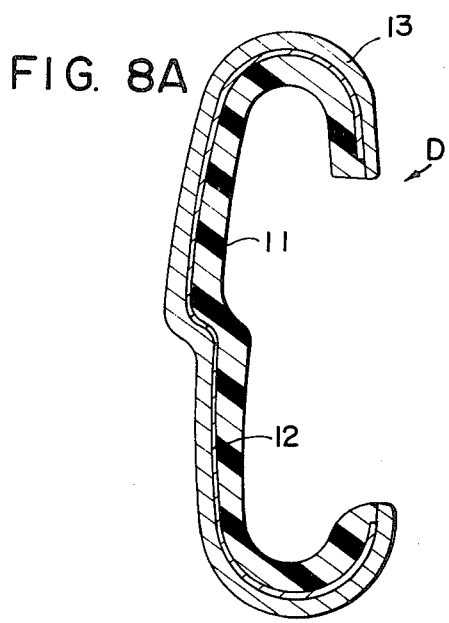
FIGS. 8a and 8c are sectional views showing door frame trims according to the present invention.
Figure 8C:
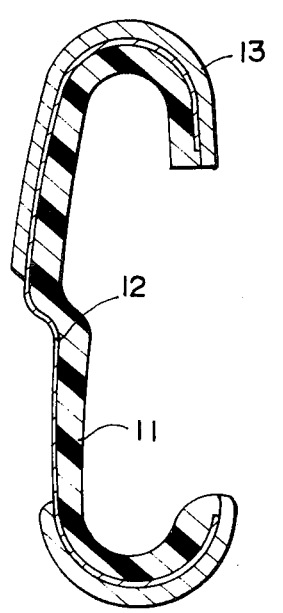
Figure 8B:
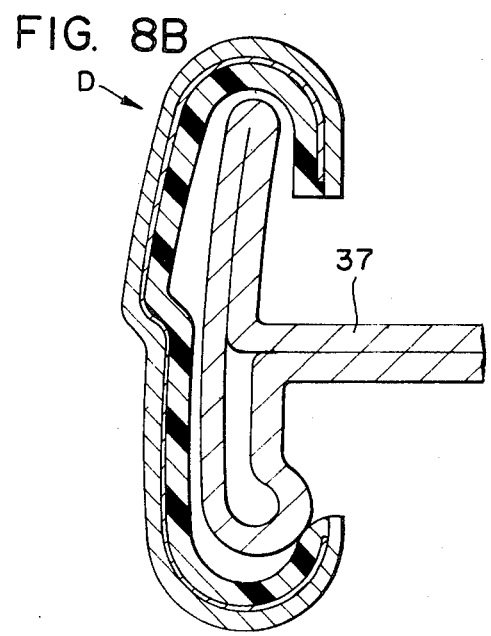
FIG. 8b is a sectional view illustrating an application of said door frame trim.

FIG. 8a relates to a door frame trim D with an approximately C-letter opening, which engages the door frame 37.

FIG. 9a relates to a step trim E, which is attached to the body surface 22 by means of a cap clip 38.

FIG. 10a relates to a quarter window trim F; this embodiment is similar to the trim A1 for direct-glazed window. Namely, the trim F is attached to the clip 42 fitted to the T-stud 41 of the panel quarter 40, thereby fixing the quarter window 43, 44 being the bonding agent.

In all the trims described above, the topmost film of PVC resin composition may be a colored matt surface or a multicolored one, though not specifically mentioned.

In the above drawings affixed with C, the exposed area of the metal layer 12 can be a desired portion of the visible part of the trim; and various other means of exposure are possible.

As explained in the above, according to the present invention a matt film of PVC resin composition is formed on the trim surface, thereby presenting a unique appearance of the trim never given so far. When a desirable pigment is added to said resin composition, the trim can be easily colored; and depending on the combination of colores, more than two tones can be developed. Further by partial exposure of the metal layer which constitutes a visible part of the trim, a fanciful appearance with a strong contrast between matt surface and metal gloss surface can be given to the trim.

Thus the present invention can enhance the aesthetic effect of the trim. Meanwhile coating of the trim surface with a matt film prevents reflection of light and gives an anti-glare effect, which will contribute to safe driving.

Further, presence of a soft PVC resin film on the trim surface, especially at the interface with the body surface is effective to prevent the body paint surface from being injured when the trim is attached to the auto body or thereafter; to prevent generation of noise in driving; and to prevent the socalled electrolytic corrosion of body plate through contact with the metal layer of the trim and thus a rusting of the body through a scratch on the body paint surface.

What is claimed is:

1. A trim for an automobile comprising:
   a plastic substrate
   a metal layer having a thickness of 0.03–0.2 mm integrally laminated on a surface of said plastic substrate; and
   a film of a PVC resin composition having a matt finish and integrally laminated on said metal layer, said PVC resin composition comprising a PVC resin having a viscometric degree of polymerization, $\overline{P}$, of 2000–5000 and 20–50 parts by weight per 100 parts of said PVC resin of a calcium carbonate filler.

2. The trim of claim 1, wherein said metal layer is wholly coated with said film, thereby giving a matt surface to the whole trim.

3. The trim of claim 1, wherein said metal layer is not wholly coated with said film to expose a part of said metal layer, thereby forming a matt surface and a metal gloss surface in the trim.

* * * * *